US010907521B2

(12) United States Patent
Ren et al.

(10) Patent No.: US 10,907,521 B2
(45) Date of Patent: Feb. 2, 2021

(54) METHODS FOR OPERATING AND DIAGNOSING INTERNAL COMBUSTION ENGINE EXHAUST GAS TREATMENT SYSTEMS

(71) Applicant: GM GLOBAL TECHNOLOGY OPERATIONS LLC, Detroit, MI (US)

(72) Inventors: Shouxian Ren, Rochester Hills, MI (US); Gongshin Qi, Troy, MI (US); Rahul Mital, Rochester Hills, MI (US); Anirban Sett, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 63 days.

(21) Appl. No.: 16/206,021

(22) Filed: Nov. 30, 2018

(65) Prior Publication Data
US 2020/0173327 A1 Jun. 4, 2020

(51) Int. Cl.
| | | |
|---|---|---|
| *F01N 3/20* | (2006.01) | |
| *F01N 3/10* | (2006.01) | |
| *F02D 41/02* | (2006.01) | |
| *B01D 53/94* | (2006.01) | |

(52) U.S. Cl.
CPC .......... *F01N 3/208* (2013.01); *B01D 53/9418* (2013.01); *B01D 53/9459* (2013.01); *B01D 53/9495* (2013.01); *F01N 3/106* (2013.01); *F02D 41/0235* (2013.01); *F01N 2610/02* (2013.01); *F01N 2900/1602* (2013.01);
(Continued)

(58) Field of Classification Search
CPC ......... Y02T 10/47; Y02T 10/24; Y02T 10/44; Y02T 10/123; Y02T 10/144; F01N 3/2066; F01N 2560/026; F01N 2550/02; F01N 3/0842; F01N 2610/02; F01N 2900/1402; F01N 11/007; F01N 3/208; F01N 11/002; F01N 2900/08; F01N 3/20; F01N 3/101; F01N 3/103
See application file for complete search history.

(56) References Cited

U.S. PATENT DOCUMENTS

2010/0107606 A1* 5/2010 Narayanaswamy ........................ B01D 53/9418
60/274
2012/0117954 A1* 5/2012 Yasui ...................... F01N 3/208
60/301
(Continued)

*Primary Examiner* — Anthony Ayala Delgado

(57) ABSTRACT

Internal combustion engine (ICE) exhaust gas treatment systems include the ICE having one or more cylinders configured to receive a mixture of air and fuel defined by an air to fuel ratio (AFR) for combustion therein, a control module configured to control the AFR, a diesel oxidation catalyst (DOC) configured to receive exhaust gas generated by the ICE and oxidize NOx species within the exhaust gas, and a selective catalytic reduction device (SCR) configured to receive exhaust gas from the DOC. Methods for operating and diagnosing such systems include determining, via the control module, a baseline value of a SCR performance parameter which is unsuitable, changing, via the control module, the AFR to change the DOC outlet NO2:NOx ratio, subsequently assessing a second value of the SCR performance parameter, and implementing a control action based on the second value of the SCR performance parameter.

20 Claims, 5 Drawing Sheets

(52) U.S. Cl.
CPC ............... *F01N 2900/1616* (2013.01); *F01N 2900/1621* (2013.01)

(56) References Cited

U.S. PATENT DOCUMENTS

2015/0027106 A1* 1/2015 De Filippo ......... F02D 41/1441
                                                    60/274
2017/0138285 A1* 5/2017 Srinivasan .............. F01N 3/101

* cited by examiner

METHODS FOR OPERATING AND DIAGNOSING INTERNAL COMBUSTION ENGINE EXHAUST GAS TREATMENT SYSTEMS

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons (HC), oxides of nitrogen ($NO_x$), and oxides of sulfur ($SO_x$), as well as condensed phase materials (liquids and solids) that constitute particulate matter. Liquids can include water and hydrocarbons, for example.

Exhaust gas treatment systems may employ catalysts in one or more components configured for accomplishing an after-treatment process such as reducing $NO_x$ to produce more tolerable exhaust constituents of nitrogen ($N_2$) and water ($H_2O$). One type of exhaust treatment technology for reducing $NO_x$ emissions is a selective catalytic reduction device (SCR), which generally includes a substrate or support with a catalyst compound disposed thereon. Passing exhaust over the catalyst converts certain or all exhaust constituents in desired compounds, such as non-regulated exhaust gas components. A reductant is typically sprayed into hot exhaust gases upstream of the SCR, decomposed into ammonia, and absorbed by the SCR. The ammonia then reduces the $NO_x$ to nitrogen and water in the presence of the SCR catalyst. Another type of exhaust treatment device is an oxidation catalyst (OC) device, which is commonly positioned upstream from a SCR to serve several catalytic functions, including oxidizing HC and CO species. Further, OCs can convert NO into NO2 to alter the NO: $NO_x$ ratio of exhaust gas in order to increase the $NO_x$ reduction efficiency of the downstream SCR.

SUMMARY

Methods for operating an internal combustion engine (ICE) exhaust gas treatment system are provided. An ICE exhaust gas treatment system can include the ICE, having one or more cylinders configured to receive a mixture of air and fuel having an air to fuel ratio (AFR) for combustion therein, a control module configured to control the AFR, a diesel oxidation catalyst device (DOC) configured to receive exhaust gas generated by the ICE and oxidize NOx species within the exhaust gas, and a selective catalytic reduction device (SCR) configured to receive exhaust gas from the DOC and reductant dosed to the SCR according to one or more dosing parameters. The method includes determining, via the control module, a baseline value of a SCR performance parameter which is unsuitable, changing, via the control module, the AFR with a first magnitude of change in a first direction relative to an initial AFR, subsequently assessing a second value of the SCR performance parameter. If the second value of the SCR performance parameter is improved relative to the baseline value of the SCR performance parameter, the method can further include implementing a control action based on the second value of the SCR performance parameter. Alternatively, if the second value of the SCR performance parameter is worsened relative to the baseline value of the SCR performance parameter, the method can further include changing the AFR in a second direction opposite to the first direction with a second magnitude of change which is greater than the first magnitude of change, subsequently assessing a third value of the SCR performance parameter, and implementing a control action based on the third value of the SCR performance parameter. The ICE powers a vehicle, and the method can further include achieving one or more vehicle enabling conditions prior to changing the AFR. The method can further include determining a SCR temperature above a performance temperature threshold prior to determining the baseline value of the SCR performance parameter which is unsuitable. The method can further include, subsequent to determining the baseline value of the SCR performance parameter which is unsuitable and prior to changing the AFR, adjusting one or more reductant dosing parameters. The SCR performance parameter can be one or more of a NOx reduction efficiency parameter, a NOx breakthrough parameter, and an NH3 slip parameter. The first direction of change of the AFR can be selected based on an age of the DOC. Changing the AFR in the first direction can include increasing the AFR relative to the initial AFR if the DOC age is above an aging threshold. Changing the AFR in the first direction can include decreasing the AFR relative to the initial AFR if the DOC age is below an aging threshold. If either of the second value of the SCR performance parameter or the third value of the SCR performance parameter is unsuitable, implementing the control action can include one or more of implementing a DOC-specific control action speed-limiting a vehicle appurtenant to the ICE exhaust gas treatment system, and power-limiting a vehicle appurtenant to the ICE exhaust gas treatment system. If either of the second value of the SCR performance parameter or the third value of the SCR performance parameter is suitable, implementing the control action can include one or more of implementing a non-DOC-specific control action, speed-limiting a vehicle appurtenant to the ICE exhaust gas treatment system, and power-limiting a vehicle appurtenant to the ICE exhaust gas treatment system.

A method for diagnosing a diesel oxidation catalyst (DOC) of an internal combustion engine (ICE) exhaust gas treatment system is provided. The ICE exhaust gas treatment system includes the ICE, including one or more cylinders configured to receive a mixture of air and fuel having an air to fuel ratio (AFR) for combustion therein, a control module configured to control the AFR, the DOC configured to receive exhaust gas generated by the ICE and oxidize NOx species within the exhaust gas, and a selective catalytic reduction device (SCR) configured to receive exhaust gas from the DOC. The method can include determining, via the control module, a baseline value of a SCR performance parameter which is unsuitable, changing, via the control module, the AFR, subsequently assessing a second value of the SCR performance parameter, and implementing a control action if the second value of the SCR performance parameter is unsuitable. Changing the AFR can include reducing the AFR if an age of the DOC is below an age threshold. Changing the AFR can include increasing the AFR if an age of the DOC is above an age threshold. The method can further include determining a SCR temperature above a performance temperature threshold prior to determining the baseline value of the SCR performance parameter which is unsuitable. The SCR performance parameter can include one or more of a NOx reduction efficiency parameter, a NOx breakthrough parameter, and an NH3 slip parameter. Implementing the control action can include one or more of implementing a DOC-specific control action speed-limiting a vehicle appurtenant to the ICE exhaust gas treatment system, and power-limiting a vehicle appurtenant to the ICE exhaust gas treatment system.

A method for operating an internal combustion engine (ICE) exhaust gas treatment system is provided. The ICE exhaust gas treatment system can include the ICE, including one or more cylinders configured to receive a mixture of air and fuel for combustion therein, a control module configured to control a ratio of air and fuel having an air to fuel ratio (AFR) delivered to the one or more cylinders of the ICE, a diesel oxidation catalyst device (DOC) configured to receive exhaust gas generated by the ICE and oxidize NOx species within the exhaust gas, and a selective catalytic reduction device (SCR) configured to receive exhaust gas from the DOC. The method can include determining a SCR temperature below a performance temperature threshold, and increasing, via the control module, the AFR in order to improve SCR performance. The method can further include determining, via the control module, a baseline value of a SCR performance parameter which is unsuitable prior to increasing, via the control module, the AFR. The SCR performance parameter can include one or more of a NOx reduction efficiency parameter, a NOx breakthrough parameter, and an NH3 slip parameter. The method can further include subsequently determining a SCR temperature above the performance temperature threshold, and decreasing, via the control module, the AFR.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Generally, this disclosure pertains to systems and methods for operating and diagnosing internal combustion engine (ICE) and exhaust gas treatment systems, particularly those including oxidation catalyst devices (OC) and selective catalytic reduction devices (SCR). In particular, the systems and methods described herein monitor the performance of OCs and SCRs, optimize the performance thereof, and further provide for mitigation actions as determined suitable. The methods disclosed herein are particularly suitable for use with ICE exhaust gas treatment systems, although other applications are also foreseen. Methods described herein are germane to ICE systems that can include, but are not limited to, diesel engine systems, gasoline direct injection systems, and homogeneous charge compression ignition engine systems. An ICE can include a plurality of reciprocating pistons attached to a crankshaft which may be operably attached to a driveline, such as a vehicle driveline, to power a vehicle (e.g., deliver tractive torque to the driveline). For example, an ICE can be any engine configuration or application, including various vehicular applications (e.g., automotive, marine and the like), as well as various non-vehicular applications (e.g., pumps, generators and the like). While the ICEs may be described in a vehicular context (e.g., generating torque), other non-vehicular applications are within the scope of this disclosure. Therefore, when reference is made to a vehicle, such disclosure should be interpreted as applicable to any application of an ICE.

Figure 1:
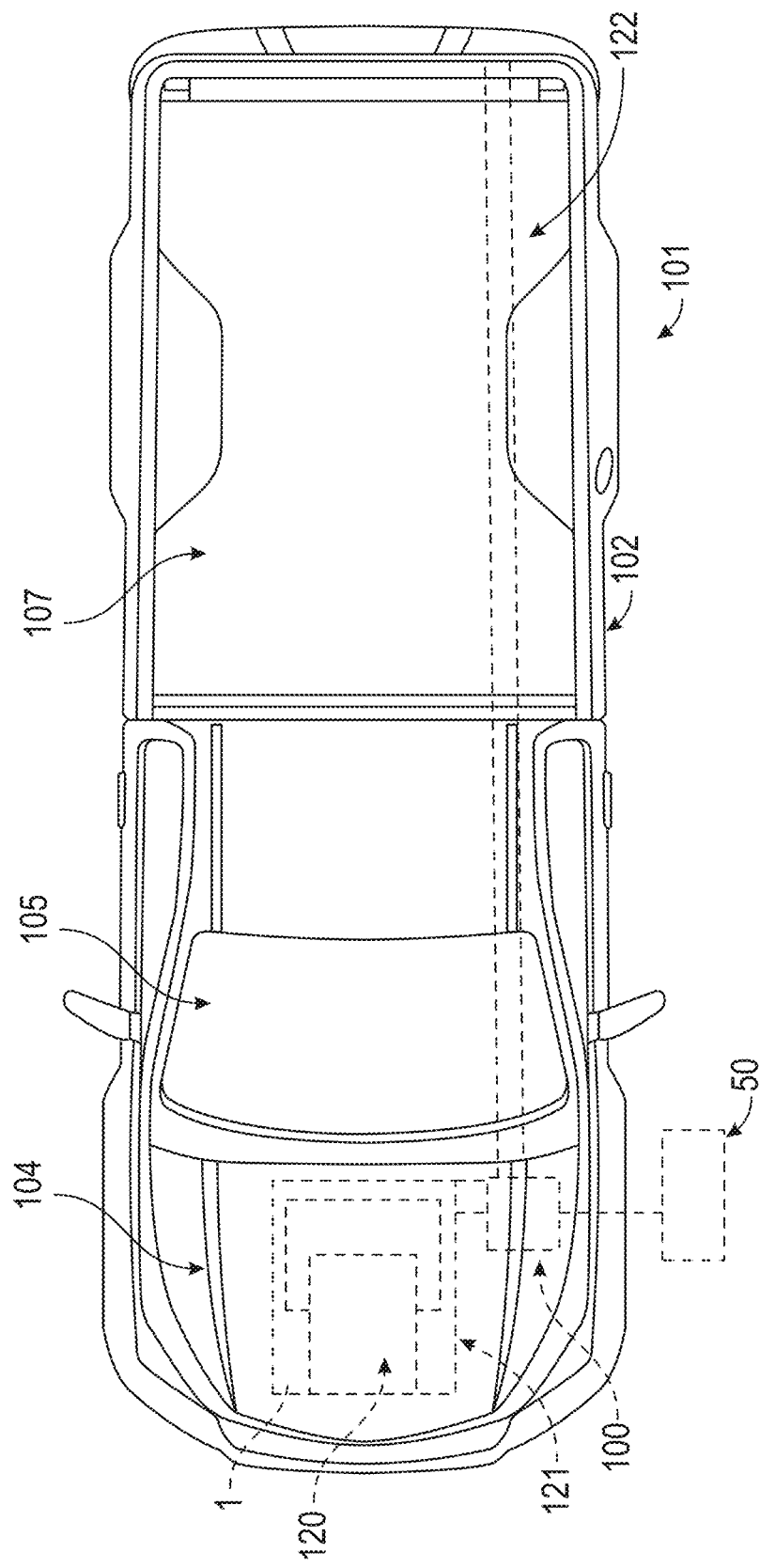
FIG. 1 illustrates a schematic view of a motor vehicle, according to one or more embodiments.

A schematic view of a motor vehicle 101 is illustrated in FIG. 1. Motor vehicle 101 is shown in the form of a pickup truck, but it is to be understood that motor vehicle 101 may take on various forms including automobiles, commercial transports, marine vehicles, and the like. Motor vehicle 101 includes a body 102 having an engine compartment 104, and optionally a passenger compartment 105 and/or a cargo bed 107. Engine compartment 104 houses an ICE system 120, including an ICE 1. Air and fuel are delivered to one or more cylinders (not shown) of ICE 1 for combustion therein. ICE 1 can include one or more cylinders (not shown) capable of each accepting a piston (not shown) which can reciprocate therein. Air and fuel are combusted in the one or more cylinders thereby reciprocating the appurtenant pistons therein. The pistons can be attached to a crankshaft (not shown) operably attached to a vehicle driveline (not shown) in order to deliver tractive torque thereto, for example. ICE system 120 further includes an exhaust system 121 that is fluidically connected to an aftertreatment or exhaust gas treatment system 100. Exhaust produced by ICE system 120 passes through exhaust gas treatment system 100 to reduce and/or convert emissions that may exit to ambient through an exhaust tail pipe 122. Control module 50 is operatively connected to exhaust gas treatment system 100 and ICE system 120. Control module 50 can be configured to control the delivery of air and fuel to the one or more cylinders of ICE 1, for example. Controlling the delivery of air and fuel to the one or more cylinders of ICE 1 can include the timing of such deliveries, and the ratio of air:fuel ("AFR") of such deliveries, for example. As used herein, an AFR can refer to the collective, or average AFR for all cylinders of ICE 1, as various cylinders of a particular ICE 1 may have different AFRs relative to other cylinders.

Figure 2:
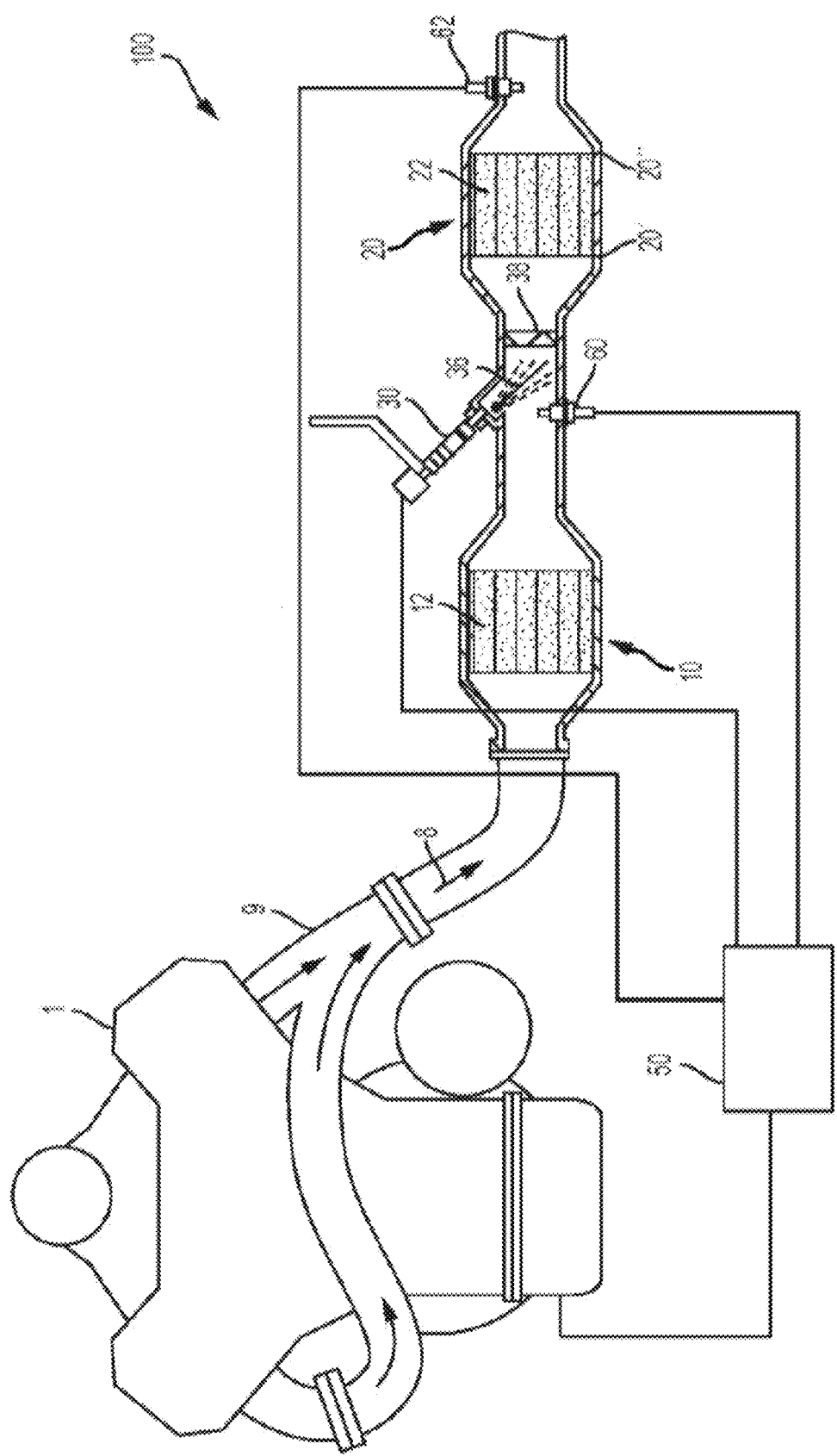
FIG. 2 illustrates a schematic view of an exhaust gas treatment system, according to one or more embodiments.

FIG. 2 illustrates an exhaust gas treatment system 100 utilizing an OC and a SCR for treating and/or monitoring gas species, such as species of exhaust gas 8 generated by an ICE 1. System 100 generally includes one or more exhaust gas conduits 9, and one or more downstream exhaust treatment devices. Upstream and downstream are defined in relation to the direction of the flow of exhaust gas 8 from ICE 1. As used herein, a plurality of elements described as being upstream and/or downstream from each other are necessarily in fluid communication with each other. The exhaust gas conduit 9, which can comprise several segments, transports exhaust gas 8 from the ICE 1 to the various exhaust treatment devices of the exhaust gas treatment system 100. ICE 1 is included in system 100 for the purposes of illustration only, and the disclosure herein is not to be limited to gas sources provided by ICEs. It should be further understood that the embodiments disclosed herein may be applicable to treatment of any exhaust streams including oxides of nitrogen (NOx), carbon monoxide (CO), HC, or other chemical species which are desirably combusted or otherwise oxidized by OCs. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$. HC refers to combustable chemical species comprising hydrogen and carbon, and generally includes one or more chemical species of gasoline, diesel fuel, or the like.

Exhaust gas 8 is expelled from ICE 1 and sequentially communicated to OC 10, and SCR 20. A reductant injector 30 is configured to inject reductant 36, for example at variable dosing rates, into exhaust gas conduit 9 downstream from OC 10 and upstream from SCR 20. System 100 can optionally include a particulate filter device (not shown). Exhaust gas 8 is can be expelled from system 100 via the tailpipe 122, for example. System 100 can further include a control module 50 operably connected via a number of sensors to monitor ICE 1 and/or the exhaust gas treatment system 100. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. The control module 50 can be operably connected to ICE 1, OC 10, SCR 20, and/or one or more sensors. For example, as shown, control module 50 is in communication with upstream $NO_x$ sensor 60 and a downstream $NO_x$ sensor 62.

In general, the SCR 20 includes all devices which utilize a reductant 36 and a catalyst to reduce NOx species to desired chemical species, including diatomic nitrogen, nitrogen-containing inert species, or species which are considered acceptable emissions, for example. The reductant 36 can be ammonia ($NH_3$), such as anhydrous ammonia or aqueous ammonia, or generated from a nitrogen and hydrogen rich substance such as urea ($CO(NH_2)_2$) which is capable of decomposing or otherwise reacting in the presence of exhaust gas and/or heat into $NH_3$. Additionally or alternatively, reductant 36 can be any compound capable of decomposing or reacting in the presence of exhaust gas 8 and/or heat to form ammonia. The reductant 36 can be diluted with water in various implementations. In implementations where the reductant 36 is diluted with water, heat (e.g., from the exhaust) evaporates the water, and ammonia is supplied to the SCR 20. Non-ammonia reductants can be used as a full or partial alternative to ammonia as desired. In implementations where the reductant 36 includes urea, the urea reacts with the exhaust to produce ammonia, and ammonia is supplied to the SCR 20. Equation (1) below provides an exemplary chemical reaction of ammonia production via urea decomposition.

$$CO(NH_2)_2 + H_2O \rightarrow 2NH_3 + CO_2 \quad (1)$$

It should be appreciated that Equation (1) is merely illustrative, and is not meant to confine the urea or other reductant 36 decomposition to a particular single mechanism, nor preclude the operation of other mechanisms. Efficient decomposition urea to $NH_3$ typically requires temperatures in excess of about 200° C., and, depending on the amount of urea injected, for example relative to a flow rate of exhaust gas 8, urea can crystalize in temperatures less than about 200° C. Accordingly, reductant 36 injection events and/or dosing quantities are typically determined based upon system temperature and exhaust gas 8 flow rate, among others, such that urea decomposition yield is maximized and urea crystallization is minimized.

Equations (2)-(6) provide exemplary chemical reactions for $NO_x$ reduction involving ammonia.

$$6NO + 4NH_3 \rightarrow 5N_2 + 6H_2O \quad (2)$$

$$4NO + 4NH_3 + O_2 \rightarrow 4N_2 + 6H_2O \quad (3)$$

$$6NO_2 + 8NH_3 \rightarrow 7N_2 + 12H_2O \quad (4)$$

$$2NO_2 + 4NH_3 + O_2 \rightarrow 3N_2 + 6H_2O \quad (5)$$

$$NO + NO_2 + 2NH_3 \rightarrow 2N_2 + 3H_2O \quad (6)$$

It should be appreciated that Equations (2)-(6) are merely illustrative, and are not meant to confine SCR 20 to a particular $NO_x$ reduction mechanism or mechanisms, nor preclude the operation of other mechanisms. SCR 20 can be configured to perform any one of the above $NO_x$ reduction reactions, combinations of the above $NO_x$ reduction reactions, and other $NO_x$ reduction reactions.

As shown in FIG. 2, SCR 20 includes a catalytic composition (CC) 22 packaged in a shell or canister generally defining an upstream side 20' (i.e., inlet) and a downstream side 20" (i.e., outlet) and disposed in fluid communication with exhaust gas conduit 9 and optionally other exhaust treatment devices (e.g., OC 10). The shell or canister can comprise a substantially inert material, relative to the exhaust gas constituents, such as stainless steel. SCR 20 is configured to receive exhaust gas 8 and reductant 36 at upstream side 20'. Reductant 36 can be supplied from a reductant reservoir (not shown) and injected into the exhaust gas conduit 9 at a location upstream from SCR 20 via an injector 30, or other suitable delivery means. Reductant 36 can be in the form of a gas, a liquid, or an aqueous solution, such as an aqueous urea solution. Reductant 36 can be mixed with air in the injector 30 to aid in the dispersion of the injected spray. A turbulator 38 (i.e., mixer) can also be disposed within the exhaust conduit 9 in close proximity to the injector 30 and/or the SCR 20 to further assist in thorough mixing of reductant 36 with the exhaust gas 8 and/or even distribution throughout the SCR 20, and particularly throughout CC 22.

CC 22 can be a porous and high surface area material which can operate efficiently to convert $NO_x$ constituents in the exhaust gas 8 in the presence of a reductant 36, such as ammonia. For example, the catalyst composition can contain a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, the catalyst composition can contain a zeolite impregnated with one or more of copper, iron, or vanadium. In some embodiments the zeolite can be a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable CCs 22 can have high thermal structural stability, particularly when used in tandem with particulate filters (e.g., diesel particulate filters) or when incorporated into selective catalytic reduction filter devices (SCRF), which are regenerated via high temperature exhaust soot burning techniques. CC 22 can optionally further comprise one or more base metal oxides as promoters to further decrease the $SO_3$ formation and to extend catalyst life. The one or more base metal oxides can include $WO_3$, $Al_2O_3$, and $MoO_3$, in some embodiments. In one embodiment, $WO_3$, $Al_2O_3$, and $MoO_3$ can be used in combination with $V_2O_5$.

SCR 20 can have a light-off temperature above which CC 22 exhibits desired or suitable catalytic activity or yield (e.g., reduction of NOx species). The light-off temperature can be dependent upon the type of catalytic materials of which CC 22 is comprised, and the amount of catalytic materials present in SCR 20, among other factors. When SCR 20 operates at a temperature below its light-off temperature, undesired $NO_x$ breakthrough can occur wherein $NO_x$ passes through SCR 20 unreacted or unstored.

CC 22 can be disposed on a substrate body, such as a metal or ceramic brick, plate, or monolithic honeycomb structure. CC 22 can be deposited on the substrate body as a washcoat, for example. The substrate body can be formed from a material capable of withstanding the temperatures and chemical environment associated with the exhaust gas 8. In some embodiments, the substrate body can comprise one or more ceramics, such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The substrate can comprise a non-sulfating $TiO_2$ material, for example. One example of an exhaust gas treatment device is a SCRF which provide the catalytic aspects of SCRs in addition to particulate filtering capabilities. Generally, an SCRF comprises CC 22 applied to a filter substrate, such as a ceramic or SiC wall flow monolith filter, wound or packed fiber filters, open cell foams, sintered metal fibers, etc. Any references to SCRs herein are intended to include SCRFs.

The SCR 20 can store (i.e., absorb, and/or adsorb) reductant for interaction with exhaust gas 8. For example, the reductant can be stored within the SCR as ammonia. During operation of SCR 20, injected reductant 36 can be stored in SCR 20 and subsequently consumed during reduction reactions with NOx species. A given SCR has a reductant capacity, or an amount of reductant or reductant derivative it is capable of storing. The amount of reductant stored within a SCR relative to the SCR capacity can be referred to as the SCR "reductant loading", and can be indicated as a % loading (e.g., 90% reductant loading) in some instances.

During operation of SCR 20, injected reductant 36 is stored in the SCR 20 and consumed during reduction reactions with NOx species and must be continually replenished. Determining the precise amount of reductant 36 to inject is critical to maintaining exhaust gas emissions at acceptable levels: insufficient reductant levels within the system 100 (e.g., within SCR 20) can result in undesirable NOx species emissions ("NOx breakthrough") from the system (e.g., via vehicle tailpipe 122), while excessive reductant 36 injection can result in undesirable amounts of reductant 36 passing through the SCR 20 unreacted or exiting the SCR 20 as an undesired reaction product ("reductant slip"). Reductant slip and NOx breakthrough, and generally unsuitable SCR 20 NOx conversion efficiency, can also occur when the SCR catalyst is below a "light-off" temperature.

SCR dosing logic can be utilized to command reductant 36 dosing, and adaptations thereof, and can be implemented by control module 50. For example, the control module 50 can control operation of the injector 30 based on a chemical model and a desired reductant (e.g., NH3) storage set point to determine an amount of reductant 36 to be injected as described herein. A reductant injection dosing rate (e.g., grams per second) can be determined by a SCR chemical model which predicts an NH3 storage level of the SCR 20 based on one or more dosing parameters, which generally include measured and inferred process values of system 100 such as signals from one or more of reductant 36 injection (e.g., feedback from injector 30), upstream NOx (e.g., NOx signal from upstream NOx sensor 60), downstream NOx (e.g., NOx signal from downstream NOx sensor 62), and SCR 20 temperature, among many others. The SCR 20 chemical model further predicts NOx levels of exhaust gas 8 discharged from the SCR 20. The SCR chemical model, and the strategies and methods described below, can be implemented by control module 50, or alternatively by one or more electric circuits, or by the execution of logic that may be provided or stored in the form of computer readable and/or executable instructions. The SCR chemical model can be updatable by one or more process values over time, for example.

OC 10 is a flow-through device comprising a catalytic composition (CC) 12 and configured to accept exhaust gas 8. OC 10 is generally utilized to oxidize various exhaust gas 8 species, including HC species, CO, and $NO_x$ species. CC 12 can be housed within a housing, such as a metal housing, having an inlet (i.e., upstream) opening and outlet (i.e., downstream) opening, or be otherwise configured to provide structural support and facilitate fluid (e.g., exhaust gas) flow through OC 10. The housing can ideally comprise a substantially inert material, relative to the exhaust gas constituents, such as stainless steel, and may comprise any suitable shape or size including a cylindrically shaped compartment.

CC 12 can comprise many various first oxidation catalyst materials, and physical configurations thereof, for oxidizing HC, CO, and NOx. CC can further comprise a substrate such as a porous ceramic matrix or the like, for example. Substrates can comprise alumina, silica, zeolite, zirconia, titania, and/or lanthana, for example. First oxidation catalyst materials can comprise platinum group metal catalysts, metal oxide catalysts, and combinations thereof. Suitable platinum group metal catalysts can include platinum (Pt), palladium (Pd), rhodium (Rh), ruthenium (Ru), osmium (Os), or iridium (Ir), and combinations thereof, including alloys thereof. In one embodiment, suitable metals include Pt, Pd, Rh, and combinations thereof, including alloys thereof. Suitable metal oxide catalysts can include iron oxides, zinc oxides, aluminum oxides, perovskites, and combination thereof, for example. In one embodiment, CC 12 can comprise Pt and $Al_2O_3$. It is to be understood that the CC 12 is not limited to the particular examples provided, and can include any catalytically active device capable of oxidizing HC species, CO, and NOx species. In many embodiments, CC 12 comprises zeolite impregnated with one or more catalytically active base metal components. The zeolite can comprise a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ.

Figure 3:
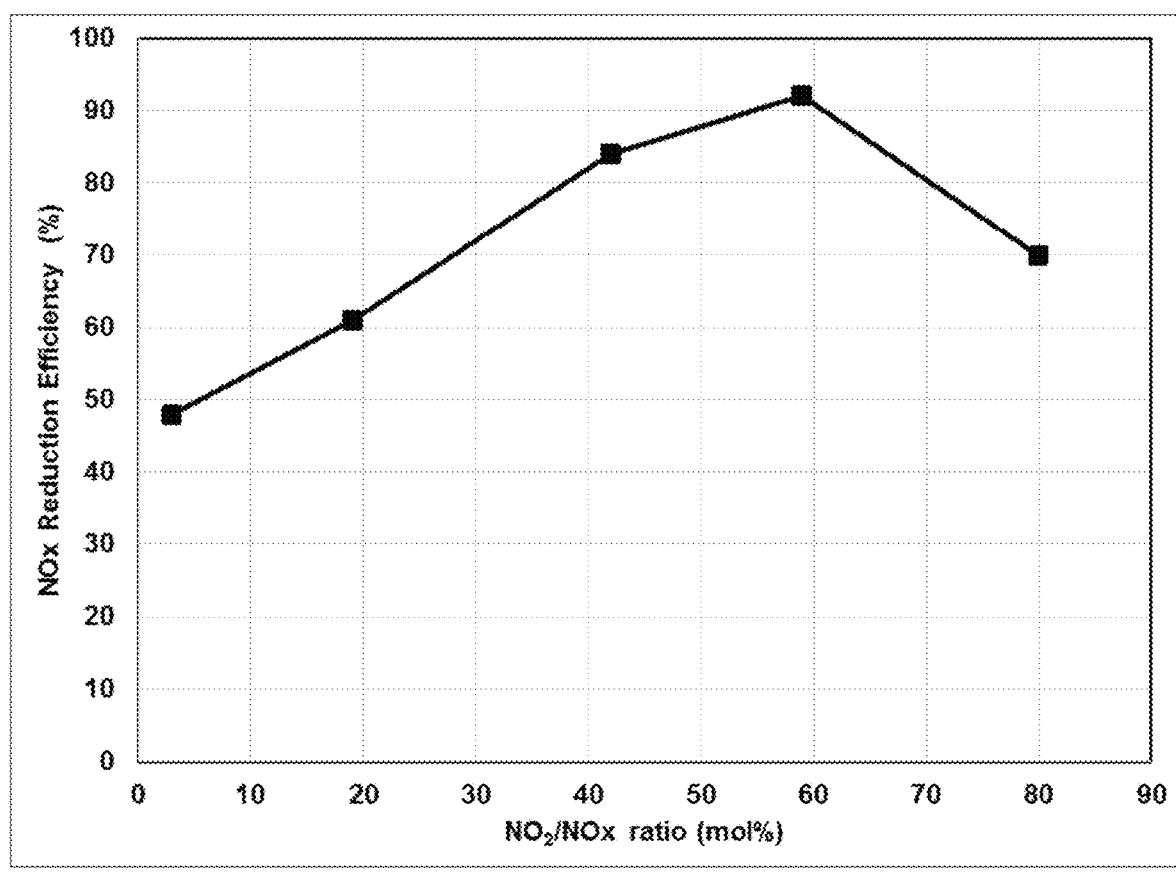
FIG. 3 illustrates a graph of the NOx reduction efficiency of a selective catalytic reduction device as a function of the exhaust gas NO2:NOx ratio communicated thereto, according to one or more embodiments.

OC 10 can oxidize NOx species in exhaust gas 8, which, for example, may form during the combustion of fuel. Specifically, OC 10 is utilized to convert NO into NO2 in order to optimize the exhaust gas NO: NO2 ratio for downstream SCRs and/or SCRFs which generally operate more efficiently with exhaust gas feed streams having a NO:NO2 ratio of about 1:1. For example, FIG. 3 illustrates a graph of the NOx reduction efficiency of a particular SCR as a function of the exhaust gas NO2:NOx ratio communicated thereto. The optimum SCR performance NO2:NOx ratio can depend on many factors, including the physical characteristics (e.g., substrate material, catalytic loading, SCR size, etc.) and age of the SCR.

Figure 4A:
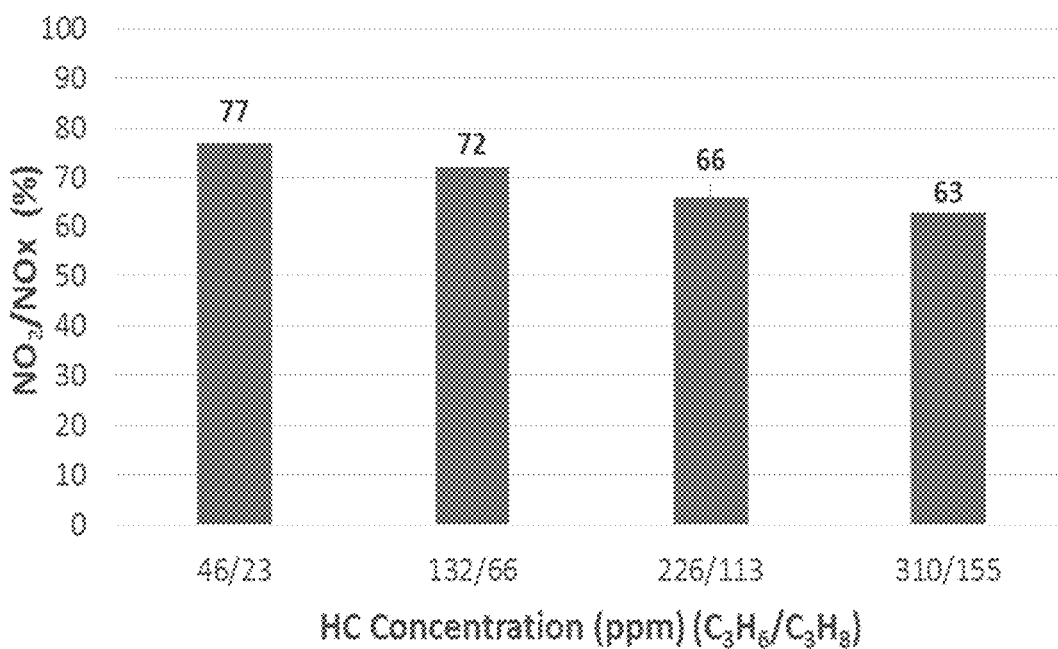
FIG. 4A illustrates a bar chart of the NO2/NOx concentration percentages at the outlet of a diesel oxidation catalyst device receiving exhaust gas streams having varying amounts of hydrocarbons, according to one or more embodiments.
Figure 4B:
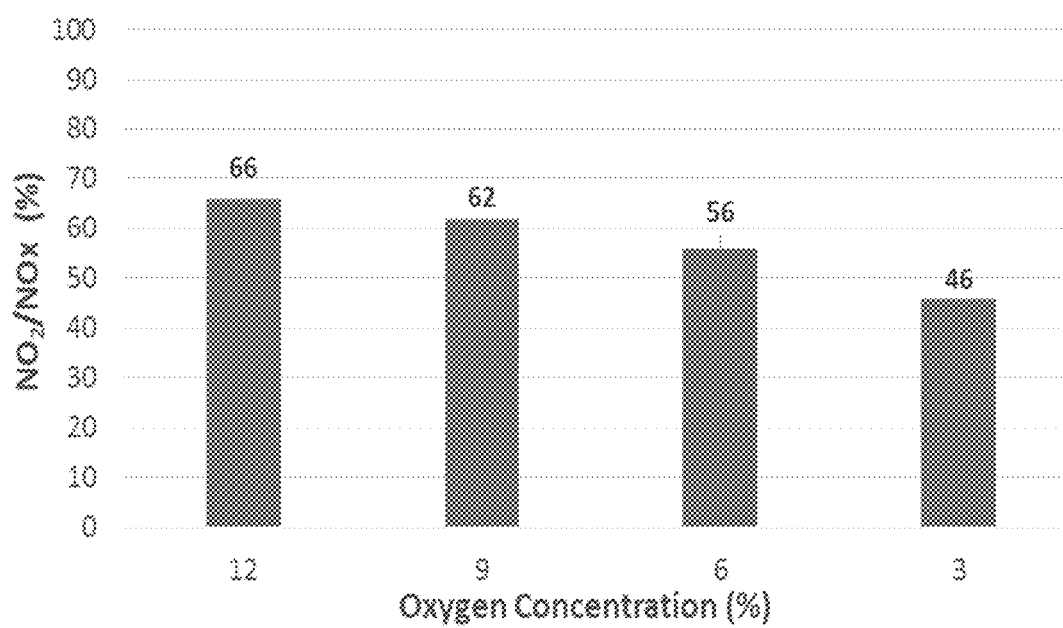
FIG. 4B illustrates a bar chart of the NO2/NOx concentration percentages at the outlet of a diesel oxidation catalyst device receiving exhaust gas streams having varying amounts of O$_2$, according to one or more embodiments.

It has been determined that the $O_2$ and HC concentration of exhaust gas 8 communicated to an OC 10 can impact the NO to NO2 oxidation efficiency thereof. For example, FIG. 4A illustrates a bar chart of the NO2/NOx concentration percentages at the outlet of a DOC receiving exhaust gas streams having varying amounts of HC (e.g., $C_3H_6$, $C_3H_8$), as measured upstream from the DOC inlet. The inlet temperature of the DOC was 259° C., and the exhaust gas upstream from the DOC inlet comprises 506 ppm CO, 12 vol. % $O_2$, 3.5 vol. % $H_2O$, 33 ppm NO, and 40 ppm NO2. It can be seen that decreasing the HC content of exhaust gas communicated to the DOC increases the NOx-oxidizing activity of the DOC, and thus increases the NO2 concentration of DOC-outlet exhaust gas. Similarly, FIG. 4B illustrates a bar chart of the NO2/NOx concentration percentages at the outlet of a DOC receiving exhaust gas streams having varying amounts of $O_2$, as measured upstream from the DOC inlet. The inlet temperature of the DOC was 259° C., and the exhaust gas upstream from the DOC inlet comprises 506 ppm CO, 3.5 vol. % $H_2O$, 310 ppm $C_3H_6$, 155 ppm $C_3H_8$, 33 ppm NO, and 40 ppm NO2. It can be seen that increasing the $O_2$ content of exhaust gas communicated to the DOC increases the NOx-oxidizing activity of the DOC, and thus increases the NO2 concentration of DOC-outlet exhaust gas.

It is difficult to determine an outlet NO2:NO ratio of a DOC, particularly in vehicular applications, due to the inherent cross-sensitivity of NOx sensors to NO2 and NO. As illustrated in FIG. 3, the NO: NO2 ratio of exhaust gas affects the NOx reduction performance of an SCR 20. Accordingly, provided herein are methods for operating and diagnosing ICE and exhaust gas treatment systems 100 which generally include altering the AFR ratio of ICE 1 with the intent to change the oxygen and/or HC content of exhaust gas 8, thereby impact the NOx oxidation performance characteristics of the OC 10, and subsequently impact the NOx reduction performance characteristics of the SCR 20. Changes in the SCR 20 NOx reduction performance characteristics of the SCR 20 can be easily measured, for example by the downstream NOx sensor 62, and such changes can be used to diagnose aspects of system 100 (e.g., DOC performance) and further optimize and generally inform the proper management of system 100. The methods and systems will be described in reference to the exhaust gas treatment system 100 of FIGS. 1 and 2, but the methods are not intended to be limited to the particular characteristics thereof. The methods as described below necessarily also describe control modules (e.g., control module 50) and appurtenant systems (e.g., exhaust gas treatment system 100) configured to implement the described methods.

Figure 5:
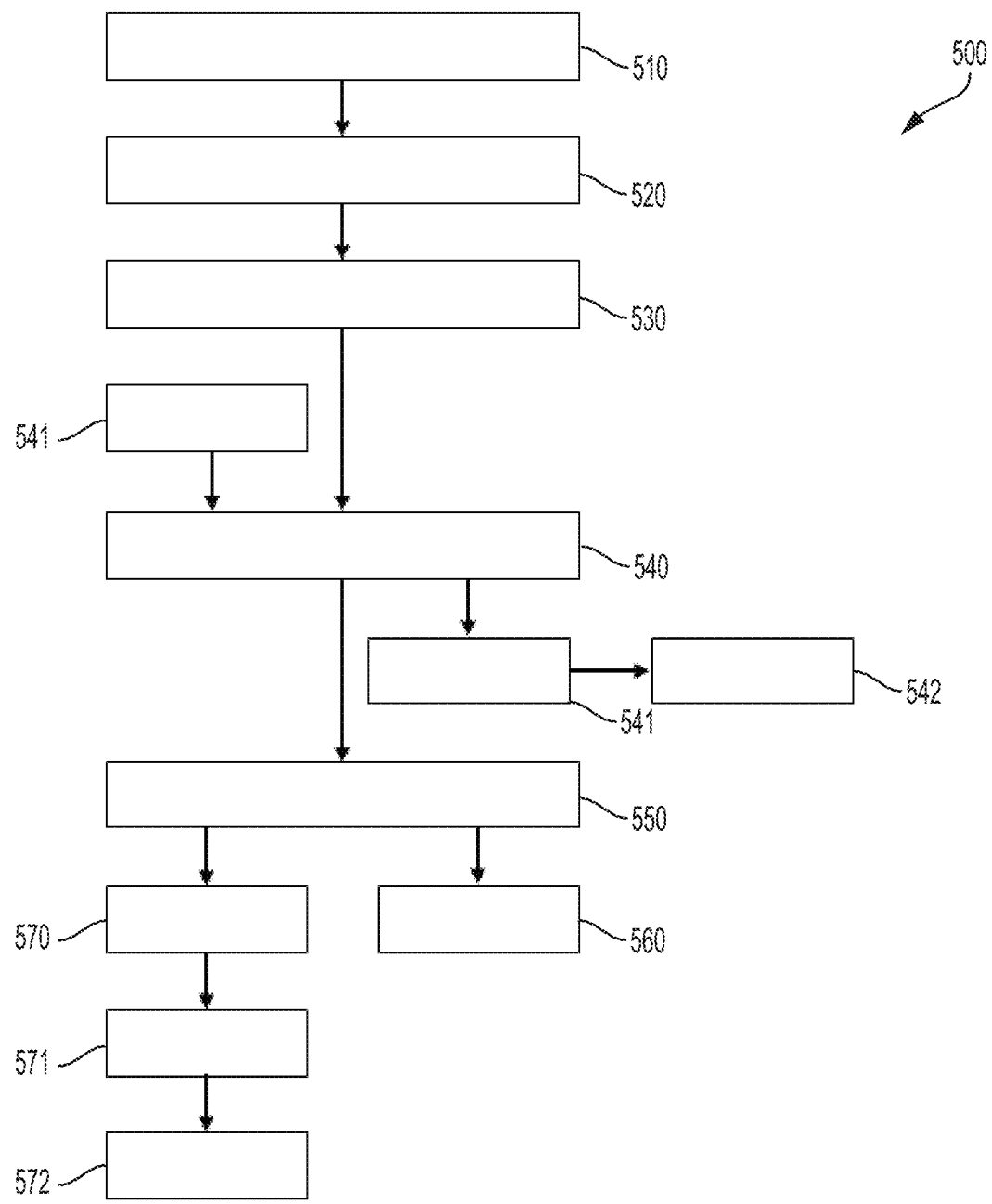
FIG. 5 illustrates a block diagram of a method for operating an internal combustion engine exhaust gas treatment system, according to one or more embodiments.

FIG. 5 illustrates a block diagram of a method 500 for operating an ICE 1 exhaust gas treatment system 100. Method 500 also comprises a method for diagnosing OC 10. As discussed above, the 1 ICE comprises one or more cylinders configured to receive a mixture of air and fuel having an AFR for combustion therein, and the control module 50 configured to control the AFR. The control module 50 can also be configured to control the dosing of reductant 36 via one or more dosing parameters. Method 500 comprises determining 520 (e.g., via the control module 50) a baseline value of a SCR 20 performance parameter which is unsuitable, changing 540 (e.g., via the control module 50) the AFR with a first magnitude of change in a first direction relative to an initial AFR, and subsequently assessing 550 a second value of the SCR performance parameter. If the second value of the SCR 20 performance parameter is improved relative to the baseline value of the SCR 20 performance parameter, method 500 further comprises implementing 560 a control action based on the second value of the SCR performance parameter. If the second value of the SCR 20 performance parameter is worsened relative to the baseline value of the SCR performance parameter, method 500 further comprises changing 570 the AFR in a second direction opposite to the first direction with a second magnitude of change which is greater than the first magnitude of change, subsequently assessing 571 a third value of the SCR 20 performance parameter, and implementing 572 a control action based on the third value of the SCR 20 performance parameter.

A SCR 20 performance parameter can comprise one or more of a NOx reduction efficiency parameter, a NOx breakthrough parameter (e.g., a concentration or flow rate of NOx downstream from SCR 20), and an NH3 slip parameter (e.g., a concentration or flow rate of NH3 downstream from SCR 20). Each of the SCR performance parameters can be deemed suitable or unsuitable relative to a respective threshold. For example, a NOx reduction efficiency parameter can be considered unsuitable if it is below a NOx reduction efficiency parameter threshold. Similarly, an NH3 slip parameter can be considered unsuitable if it is above a NH3 slip parameter threshold. Similarly, a NOx breakthrough parameter can be considered unsuitable if it is above a NOx breakthrough parameter threshold. In one embodiment, NOx reduction efficiency can be determined by equation (7):

$$\eta_{Measured} = 1 - \frac{\int NOx_{Downstream}}{NOx_{Upstream}} \tag{7}$$

wherein $NOx_{Downstream}$ is measured by the downstream NOx sensor 62 and $NOx_{Upstream}$ is measured by the upstream NOx sensor 60. Similarly, the reference NOx reduction efficiency can be determined by equation (8):

$$\eta_{Reference} = 1 - \frac{\int NOx_{Threshold}}{NOx_{Upstream}} \tag{8}$$

wherein $NOx_{Upstream}$ is measured by the upstream NOx sensor 60, and $NOx_{Threshold}$ is determined based on factors such as $NOx_{upstream}$, exhaust gas 8 flow, SCR 20 temperature, and the SCR 20 reductant 36 loading.

Method 500 accordingly determines whether the performance of the SCR 20 is suitable, and changes the AFR of ICE 1 in order to change the OC 10 NO2:NOx output ratio in order to improve or otherwise optimize a SCR 20 performance parameter. However, without knowing the current OC 10 NO2:NOx output ratio, it cannot be determined whether increasing or decreasing the OC 10 NO2:NOx output ratio will improve SCR 20 performance. Specifically, in reference to the data illustrated in FIG. 3, if the OC 10 NO2:NOx output ratio is 50%, increasing the ratio will improve SCR 20 performance (by moving the ratio toward the optimum ratio) and decreasing the ratio will degrade SCR 20 performance (by moving the ratio away from the optimum ratio). Similarly, if the OC 10 NO2:NOx output ratio is 70%, increasing the ratio will degrade SCR 20 performance (by moving the ratio away from the optimum ratio) and decreasing the ratio will improve SCR 20 performance (by moving the ratio toward the optimum ratio)

As described above, if the second value of the SCR 20 performance parameter is worsened relative to the baseline value of the SCR performance parameter, method 500 further comprises changing 570 the AFR in a second direction opposite to the first direction with a second magnitude of change which is greater than the first magnitude of change. In this instance, the OC 10 NO2:NOx output ratio was altered, via changing the AFR, in the wrong direction (i.e., away from the optimum OC 10 NO2:NOx output ratio).

In general, a new OC 10 will generally produce high amounts of NO2 (i.e., the OC 10 will exhibit high NOx oxidation capability), and will produce successively less NO2, for exhaust gas 8 of a particular composition under particular conditions, as it ages. Therefore, when the AFR is changed 540, the first magnitude of change and/or the first direction of change relative to the initial AFR can be selected based on the age of the OC 10. The age of the DOC can be determined based on one or more of the elapsed time since the OC 10 installation in system 100, the cumulative operating time (i.e., time spent receiving exhaust gas 8), and the number of extreme thermal events (e.g., diesel particulate filter regeneration events), among others. Specifically, the when the AFR is changed 540, the first magnitude of change and/or the first direction of change relative to the initial AFR can be selected based on the age of the OC 10 relative to a OC 10 age threshold. The DOC age threshold can be determined in order to effect a proper direction of change of the AFR (and thus a proper direction of change of the OC 10 NO2:NOx output ratio towards the optimum NO2:NOx output ratio). The DOC age threshold can be a calibrated static value, defined by one or more lookup tables, or dynamically determined based on factors such as the operating conditions of the OC 10 (e.g., DOC temperature), and the composition of the exhaust gas 8 received by the OC 10, among others.

Accordingly, in one embodiment, changing 540 the AFR in the first direction comprises decreasing the AFR relative to the initial AFR (and thus decreasing the OC 10 NO2:NOx output ratio) if the OC 10 age is below an aging threshold. In this embodiment, the newer OC 10 is assumed to be over-producing NO2, and the NO2:NOx output ratio is reduced towards the optimum OC 10 NO2:NOx output ratio. Similarly, in another embodiment, changing 540 the AFR in the first direction comprises increasing the AFR relative to the initial AFR (and thus increasing the OC 10 NO2:NOx output ratio) if the OC 10 age is above an aging threshold. In this embodiment, the older OC 10 is assumed to be under-producing NO2, and the OC 10 NO2:NOx output ratio is increased towards the optimum ratio.

The second value of the SCR 20 performance parameter or the third value of the SCR 20 performance parameter can be used to inform the nature of the control action implemented 560 or 572. In one embodiment, if either of the second value of the SCR 20 performance parameter or the third value of the SCR 20 performance parameter is unsuitable, implementing 560 or 572, respectively, the control action can comprise one or more of implementing a DOC-specific control action (e.g., activating a DOC alarm, servicing the DOC, updating SCR control logic to reflect a reduced DOC performance capability) speed-limiting the vehicle (e.g., limiting vehicle speed to a maximum of 50 mph), and power-limiting the vehicle. Speed-limiting and/or power-limiting can be implemented 560 or 572 as a control action after a first control action (e.g., activating an alarm) has been implemented 560 or 572, in some embodiments. In such an embodiment, suitable SCR 20 performance could not be achieved even after optimizing OC 10 NO2:NOx output ratio, and the OC 10 can accordingly be diagnosed as malfunctioning or otherwise unsuitable. Activating an alarm can comprise activating an audible alarm, illuminating an indicator (e.g., a dashboard indicator), or otherwise alerting a system (e.g., a vehicle connectivity network) or person, for example, of the unsuitable performance and/or capabilities of the OC 10. Servicing the OC 10 can comprise repairing the OC 10 (e.g., cleaning) or replacing the OC 10, for example. Updating the SCR 20 control logic can comprise updating an SCR 20 chemical model or reductant 36 dosing logic, for example.

Similarly, in one embodiment, if either of the second value of the SCR 20 performance parameter or the third value of the SCR 20 performance parameter is suitable, implementing 560 or 572, respectively, the control action comprises one or more of implementing a non-DOC-specific control action (e.g., activating a non-DOC alarm, updating SCR control logic, servicing a non-DOC device, diagnosing a non-DOC device), speed-limiting the vehicle (e.g., limiting vehicle speed to a maximum of 50 mph), and power-limiting the vehicle. Speed-limiting and/or power-limiting can be implemented 560 or 572 as a control action after a first control action (e.g., activating an alarm) has been implemented 560 or 572, in some embodiments. In such an embodiment, after achieving suitable SCR 20 performance, the DOC can be diagnosed as being capable of producing sufficient quantities of NO2 and accordingly other devices appurtenant to system 100 must be diagnosed, or serviced. A non-DOC device can include the SCR 20, the reductant injector 30, a reductant 36 reservoir appurtenant to the injector 30, and one or more sensors (e.g., NOx sensors 60, 62), among others. Diagnosing one or more aspects of the reductant 36 reservoir can include diagnosing a reservoir level sensor, or the composition of the reductant 36, for example.

Activating an alarm can comprise activating an audible alarm, illuminating an indicator (e.g., a dashboard indicator), or otherwise alerting a system (e.g., a vehicle connectivity network) or person, for example, of the unsuitable performance and/or capabilities of a non-DOC device. Servicing the non-DOC device can include repairing the non-DOC device (e.g., cleaning) or replacing the non-DOC device, for example. Updating the SCR 20 control logic can comprise updating an SCR 20 chemical model or reductant 36 dosing logic, for example.

In some embodiments, wherein the ICE 1 powers a vehicle 101, and the method further comprises achieving 541 one or more vehicle 101 enabling conditions prior to changing 540 the AFR. An enabling condition can comprise a vehicle operating condition in which changing 540 the AFR will not unsuitably impact vehicle performance, safety, or emissions standards, among others. For example, an enabling condition can include a vehicle operating condition in which the vehicle is not idling or accelerating.

In some embodiments, method 500 can further comprise determining 510 a SCR 20 temperature (e.g., via a temperature sensor) above a performance temperature threshold prior to determining 520 the baseline value of the SCR 20 performance parameter which is unsuitable. The performance temperature threshold can comprise the SCR 20 light-off temperature for example. If the determined 510 SCR 20 temperature is below the performance temperature threshold, method 500 can be discontinued as the unsuitable performance of the SCR 20 can be attributed to the unsuitably low temperature of the SCR 20 rather than OC 10 performance.

In some embodiments, method 500 can further comprise, subsequent to determining 520 the baseline value of the SCR performance parameter which is unsuitable and prior to changing 540 the AFR, adjusting 530 one or more reductant 36 dosing parameters. Subsequent to adjusting 530 one or more reductant 36 dosing parameters, a new value of the SCR 20 performance parameter can be determined. If the new value of the SCR 20 performance parameter is suitable, method 500 can be discontinued as the unsuitable performance of the SCR 20 can be attributed to reductant 36 dosing attributes rather than OC 10 performance.

Method 500 further defines a method for operating an ICE 1 exhaust gas treatment system 100 in cold conditions. Cold conditions can include ICE 1 cold starts, or generally a temperature of the SCR 20 is below an optimal or suitable operating temperature (e.g., below a SCR light-off temperature). Such a method can comprise determining 510 a SCR 20 temperature (e.g., via a temperature sensor) below a performance temperature threshold, and changing 540 (e.g., via the control module 50) the AFR to increase the AFR (and thus increase the NO2 concentration and/or flow rate of DOC-outlet exhaust gas) in order to improve SCR 20 performance (e.g., in order to improve a SCR 20 performance parameter). Changing 540 (e.g., via the control module 50) the AFR can optionally further comprise post-injecting fuel into one or more cylinders of the ICE 1, and/or exhaust into the gas treatment system 100 (e.g., into exhaust gas conduit 9) upstream from the OC 10 such that the post-injected fuel is communicated to the OC 10 uncombusted. The method can optionally further comprise determining 520 (e.g., via the control module 50) a baseline value of a SCR 20 performance parameter which is unsuitable prior to increasing (e.g., via the control module) the AFR. The method can optionally further subsequently comprise determining 541 a SCR 20 temperature above the performance temperature threshold, and decreasing 542 (e.g., via the control module) the AFR. Decreasing 542 the AFR can comprise decreasing the AFR back to the initial AFR prior to changing 540 the AFR, for example.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for operating an internal combustion engine (ICE) exhaust gas treatment system, wherein the system includes the ICE comprising one or more cylinders configured to receive a mixture of air and fuel having an air to fuel ratio (AFR) for combustion therein, a control module configured to control the AFR, a diesel oxidation catalyst device (DOC) configured to receive exhaust gas generated by the ICE and oxidize NOx species within the exhaust gas, and a selective catalytic reduction device (SCR) configured to receive exhaust gas from the DOC and reductant dosed to the SCR according to one or more dosing parameters, the method comprising:
    determining, via the control module, a baseline value of a SCR performance parameter which is unsuitable;
    changing, via the control module, the AFR with a first magnitude of change in a first direction relative to an initial AFR;
    subsequently assessing a second value of the SCR performance parameter; and
    if the second value of the SCR performance parameter is improved relative to the baseline value of the SCR performance parameter, implementing a control action based on the second value of the SCR performance parameter, or
    if the second value of the SCR performance parameter is worsened relative to the baseline value of the SCR performance parameter:
        changing the AFR in a second direction opposite to the first direction with a second magnitude of change which is greater than the first magnitude of change,
        subsequently assessing a third value of the SCR performance parameter, and
        implementing a control action based on the third value of the SCR performance parameter,
    wherein the first direction of change of the AFR is selected based on an age of the DOC.

2. The method of claim 1, wherein the ICE powers a vehicle, and the method further comprises achieving one or more vehicle enabling conditions prior to changing the AFR.

3. The method of claim 1, further comprising determining a SCR temperature above a performance temperature threshold prior to determining the baseline value of the SCR performance parameter which is unsuitable.

4. The method of claim 1, further comprising, subsequent to determining the baseline value of the SCR performance parameter which is unsuitable and prior to changing the AFR, adjusting one or more reductant dosing parameters.

5. The method of claim 1, wherein the SCR performance parameter can comprise one or more of a NOx reduction efficiency parameter, a NOx breakthrough parameter, and an NH3 slip parameter.

6. The method of claim 1, wherein changing the AFR in the first direction comprises increasing the AFR relative to the initial AFR if the DOC age is above an aging threshold.

7. The method of claim 1, wherein changing the AFR in the first direction comprises decreasing the AFR relative to the initial AFR if the DOC age is below an aging threshold.

8. The method of claim 1, wherein, if either of the second value of the SCR performance parameter or the third value of the SCR performance parameter is unsuitable, implementing the control action comprises one or more of implementing a DOC-specific control action speed-limiting a vehicle appurtenant to the ICE exhaust gas treatment system, and power-limiting a vehicle appurtenant to the ICE exhaust gas treatment system.

9. The method of claim 1, wherein, if either of the second value of the SCR performance parameter or the third value of the SCR performance parameter is suitable, implementing the control action comprises one or more of implementing a non-DOC-specific control action, speed-limiting a vehicle appurtenant to the ICE exhaust gas treatment system, and power-limiting a vehicle appurtenant to the ICE exhaust gas treatment system.

10. A method for diagnosing a diesel oxidation catalyst (DOC) of an internal combustion engine (ICE) exhaust gas treatment system, wherein the system includes the ICE comprising one or more cylinders configured to receive a mixture of air and fuel having an air to fuel ratio (AFR) for combustion therein, a control module configured to control the AFR, the DOC configured to receive exhaust gas generated by the ICE and oxidize NOx species within the exhaust gas, and a selective catalytic reduction device (SCR) configured to receive exhaust gas from the DOC, the method comprising:
 determining, via the control module, a baseline value of a SCR performance parameter which is unsuitable;
 changing, via the control module, the AFR;
 subsequently assessing a second value of the SCR performance parameter; and
 implementing a control action if the second value of the SCR performance parameter is unsuitable,
wherein changing the AFR comprises one or more of reducing the AFR if an age of the DOC is below an age threshold, and increasing the AFR if an age of the DOC is above an age threshold.

11. The method of claim 10, further comprising determining a SCR temperature above a performance temperature threshold prior to determining the baseline value of the SCR performance parameter which is unsuitable.

12. The method of claim 10, wherein the SCR performance parameter can comprise one or more of a NOx reduction efficiency parameter, a NOx breakthrough parameter, and an NH3 slip parameter.

13. The method of claim 10, wherein implementing the control action comprises one or more of implementing a DOC-specific control action speed-limiting a vehicle appurtenant to the ICE exhaust gas treatment system, and power-limiting a vehicle appurtenant to the ICE exhaust gas treatment system.

14. A method for operating an internal combustion engine (ICE) exhaust gas treatment system, wherein the system includes the ICE comprising one or more cylinders configured to receive a mixture of air and fuel having an air to fuel ratio (AFR) for combustion therein, a control module configured to control the AFR, a diesel oxidation catalyst device (DOC) configured to receive exhaust gas generated by the ICE and oxidize NOx species within the exhaust gas, and a selective catalytic reduction device (SCR) configured to receive exhaust gas from the DOC and reductant dosed to the SCR according to one or more dosing parameters, the method comprising:
 determining, via the control module, a baseline value of a SCR performance parameter which is unsuitable;
 changing, via the control module, the AFR with a first magnitude of change in a first direction relative to an initial AFR;
 subsequently assessing a second value of the SCR performance parameter; and
 if the second value of the SCR performance parameter is improved relative to the baseline value of the SCR performance parameter, implementing a control action based on the second value of the SCR performance parameter, or
 if the second value of the SCR performance parameter is worsened relative to the baseline value of the SCR performance parameter:
  changing the AFR in a second direction opposite to the first direction with a second magnitude of change which is greater than the first magnitude of change,
  subsequently assessing a third value of the SCR performance parameter, and
  implementing a control action based on the third value of the SCR performance parameter,
wherein, if either of the second value of the SCR performance parameter or the third value of the SCR performance parameter is suitable, implementing the control action comprises one or more of implementing a non-DOC-specific control action, speed-limiting a vehicle appurtenant to the ICE exhaust gas treatment system, and power-limiting a vehicle appurtenant to the ICE exhaust gas treatment system.

15. The method of claim 14, wherein the ICE powers a vehicle, and the method further comprises achieving one or more vehicle enabling conditions prior to changing the AFR.

16. The method of claim 14, further comprising determining a SCR temperature above a performance temperature threshold prior to determining the baseline value of the SCR performance parameter which is unsuitable.

17. The method of claim 14, further comprising, subsequent to determining the baseline value of the SCR performance parameter which is unsuitable and prior to changing the AFR, adjusting one or more reductant dosing parameters.

18. The method of claim 14, wherein the SCR performance parameter can comprise one or more of a NOx reduction efficiency parameter, a NOx breakthrough parameter, and an NH3 slip parameter.

19. The method of claim 14, wherein changing the AFR comprises one or more of reducing the AFR if an age of the DOC is below an age threshold and increasing the AFR if an age of the DOC is above an age threshold.

20. The method of claim 14, wherein, if either of the second value of the SCR performance parameter or the third value of the SCR performance parameter is unsuitable, implementing the control action comprises one or more of implementing a DOC-specific control action speed-limiting a vehicle appurtenant to the ICE exhaust gas treatment system, and power-limiting a vehicle appurtenant to the ICE exhaust gas treatment system.

* * * * *